United States Patent [19]

Schönnenbeck

[11] Patent Number: 5,279,523
[45] Date of Patent: Jan. 18, 1994

[54] CONE DISC TRANSMISSION, PARTICULARLY FOR MOTOR VEHICLES

[75] Inventor: Gert Schönnenbeck, Bad Homburg, Fed. Rep. of Germany

[73] Assignee: Reimers Getriebe AG, Zug, Switzerland

[21] Appl. No.: 14,173

[22] Filed: Feb. 5, 1993

[30] Foreign Application Priority Data

Feb. 6, 1992 [DE] Fed. Rep. of Germany ....... 4203363

[51] Int. Cl.⁵ .............................................. F16H 63/00
[52] U.S. Cl. ........................................ 474/28; 474/11; 474/69
[58] Field of Search ................. 474/11, 12, 17, 18, 474/28, 69, 70; 74/868, 867

[56] References Cited

U.S. PATENT DOCUMENTS 4,772,249  9/1988  Kouno et al. ................. 474/28
4,955,260  9/1990  Oshidari ....................... 474/28 X
5,088,352  2/1992  Ishimaru ....................... 74/867

FOREIGN PATENT DOCUMENTS 2946295  5/1981  Fed. Rep. of Germany .
3310786  3/1983  Fed. Rep. of Germany .
3743195  2/1989  Fed. Rep. of Germany .
3938539  6/1991  Fed. Rep. of Germany .

Primary Examiner—Thuy M. Bui
Attorney, Agent, or Firm—Spencer, Frank & Schneider

[57] ABSTRACT

An infinitely variable cone disc transmission is disclosed in which the contact pressure forces are generated fully hydraulically and in which the contact pressure level is set either solely by way of a torque sensor that is disposed on the drive shaft and constitutes a pressure medium throttle that is adjustable as a function of the load, or in which a pressurizing valve preceding this torque sensor and controlled as a function of the transmission ratio is employed to additionally effect throttling as a function of the transmission ratio.

8 Claims, 1 Drawing Sheet

CONE DISC TRANSMISSION, PARTICULARLY FOR MOTOR VEHICLES

CROSS REFERENCE TO RELATED APPLICATION

This application claims the priority of application Ser. No. P 42 03 363.2-12, filed Feb. 6, 1992, in the Federal Republic of Germany, the subject matter of which is incorporated herein by reference.

BACKGROUND OF THE INVENTION

The present invention relates to an infinitely adjustable cone disc transmission including two pairs of cone discs arranged on the driving and driven shafts as well as a transfer means rotating between the pairs of discs, with the cone discs being fixed to rotate with the shaft carrying them. On each shaft one cone disc is also axially fixed while the associated second cone disc is configured as an axially displaceable component of a cylinder-piston unit that is fixed to the shaft and to which pressure medium is supplied through an inlet from a four-edged spool valve. The latter is adjustable by means of an adjustment member and, in order to press on the transfer means and to set and maintain the transmission ratio, is provided with an outlet for the outgoing pressure medium. A discharge conduit is connected to the pressure medium outlet, with at least one torque sensor being disposed therein. This torque sensor is arranged on the drive shaft in the flow of moments at that location and influences, as a function of the load, the pressure medium pressure in the cylinder-piston units. The torque sensor is hydraulically preceded by a pressurizing valve that is adjustable as a function of the transmission ratio so as to additionally influence the pressure medium pressure.

Such a transmission is discussed as prior art in the specification of German Patent 3,743,195. There it is described that a torque sensor disposed on the driving side is hydraulically preceded by a pressurizing valve which additionally influences the pressure medium pressure exclusively as a function of the transmission ratio of the power train in such a way that, with an increasing transmission ratio of driving revolutions to driven revolutions, this pressure increases as well so that the pressure includes a component that is dependent on the transmission ratio but independent of the torque.

This pressure medium pressure is furnished by a pump, with the energy consumption of this pump for a constant conveyed stream being approximately proportional to the pressure medium pressure that it must furnish. Since the energy to be expended for operation of the pump and the friction losses as a function of contact pressure in the drive loop have a negative influence on the overall efficiency of the transmission, it is desirable to keep the pressure level as low as possible in dependence on the load state. This is relevant particularly under partial load, that is, in connection with motor vehicles, particularly in city traffic.

However, in the transmission described in German Patent 3,743,195 the result is that the pressure medium pressure may possibly be kept very high even if the load applied to the transmission is small, because the pressurizing valve operates purely as a function of the transmission ratio, particularly if the load is small but the transmission ratio is high at the same time.

SUMMARY OF THE INVENTION

It is therefore an object of the present invention to provide a cone disc transmission of the above-mentioned type in which, under a small load on the transmission, the pressurizing valve does not hold the pressure medium pressure at an unnecessarily high pressure level.

This is accomplished by the present invention in a transmission of the above-described type in that the pressurizing valve can be actuated by a control pressure which, based on the pressure determined by the torque sensor as a function of the load, is formed by a reduction as a function of the transmission ratio.

The advantage of the present invention is that no component which is purely a function of the transmission ratio influences the basic pressure in the hydraulic system, but that it is ensured here that, even with a high transmission ratio but a small load, the energy expended by the pump is not unnecessarily high.

The contact pressure forces between the pairs of cone discs and the transfer means, which are necessary for a reliable, slip-free torque transmission between the drive shaft and the driven shaft also remain at a low level so that low friction losses result.

In a preferred embodiment, the pressurizing valve is configured as a pressure ratio valve which includes a stepped piston to whose one side the pressure of the discharge conduit is applied, with a control pressure being applied to the other side. In this way, the influence of the load dependent pressure as determined by the torque sensor on the control behavior of the pressurizing valve can be preselected in a simple manner by way of the ratio between the sizes of the two sides of the stepped piston.

A spring, which additionally charges the stepped piston with a constant force on the side charged with the control pressure, can be employed to ensure that a minimum pressure value is maintained in the discharge conduit independently of the magnitude of the drop in the load to be transmitted.

To obtain the control pressure, it is possible to throttle the pressure determined by the torque sensor by means of a throttle valve.

In a preferred embodiment, this throttle valve is integrated together with the stepped piston in the same housing as the pressurizing valve, so that no separate components with additional connections and pressure conduits are required.

The throttle valve may here be actuated by means of a sensor lever which is connected with one of the movable cone discs of the pairs of cone discs and thus senses the transmission position of the drive. This is a mechanical configuration that is operationally reliable.

It is of course also conceivable to realize the dependence on the transmission ratio by way of an electronically adjustable mechanism.

The throttle valve may also be provided with a sloped control edge so that the transition between its extreme positions can be made soft and a steady change in the augmentation factor is possible between the pressure determined by the torque sensor and the basic pressure as a function of the transmission ratio of the power train.

BRIEF DESCRIPTION OF THE DRAWINGS

Further advantages and features of the invention will become evident from the description below of an embodiment thereof and from FIG. 1 which is a schematic representation of a cone disc transmission according to the invention.

DETAILED DESCRIPTION OF THE PREFERRED EMBODIMENT

Figure 1:
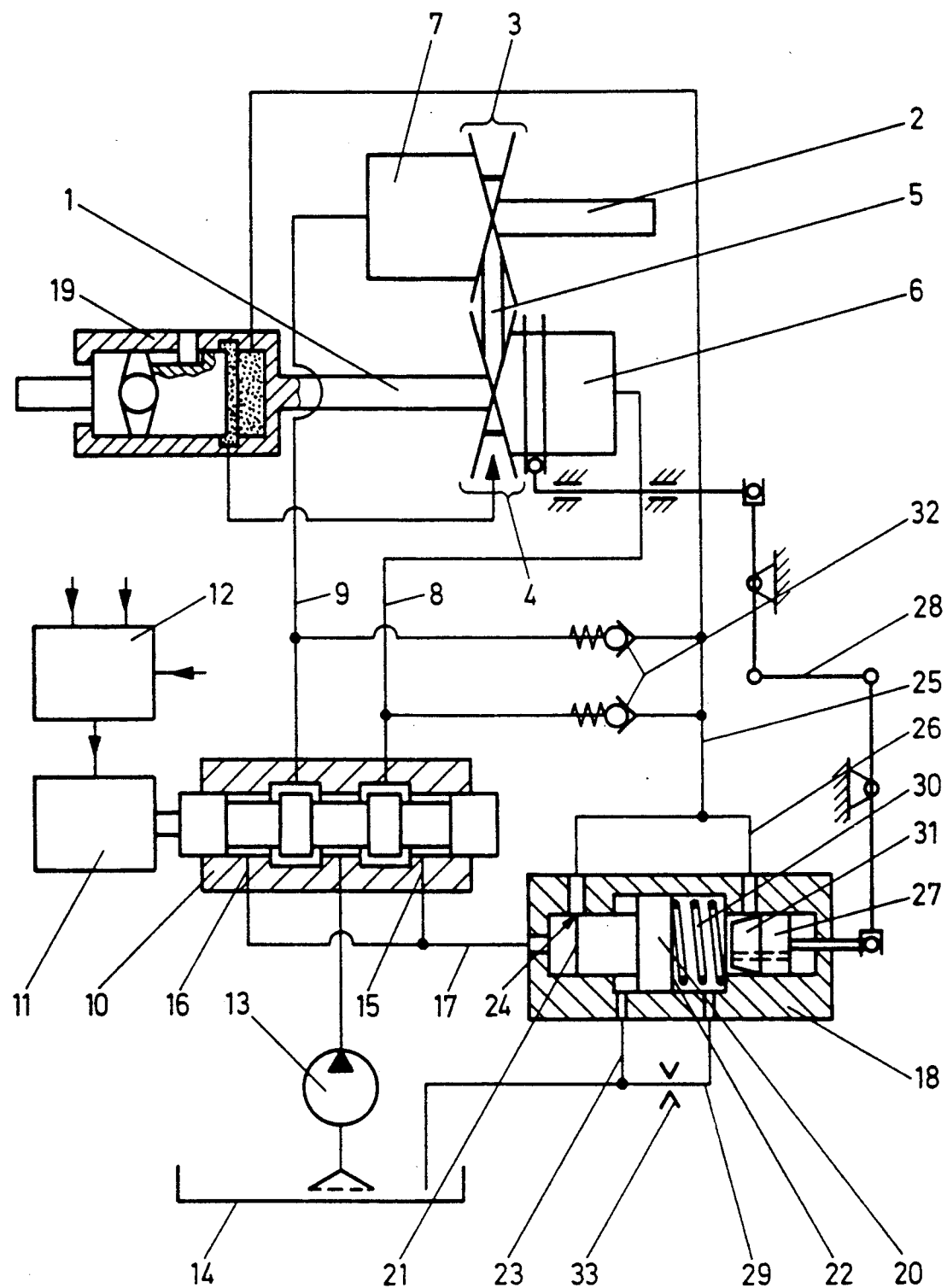

FIG. 1 is a schematic representation of a transmission which includes a drive shaft 1 and a driven shaft 2. Pairs of cone discs 3 and 4 are seated on these shafts, with a transfer means 5 rotating between them to effect the transmission of torque from drive shaft 1 to driven shaft 2. In each pair of cone discs 3 and 4, which are each fixed so as to rotate together with the shaft on which they are seated, one disc is also axially fixed while the associated second cone disc is configured as an axially displaceable component of a cylinder-piston unit 6 or 7, respectively, which is shown only schematically and is fixed to the shaft. By means of these cylinder-piston units, the transfer means is pressed on and the transmission ratio is set and maintained.

The pressure medium required for this purpose flows into cylinder-piston units 6 and 7 through pressure medium conduits 8 and 9. The quantities of pressure medium and its pressure are regulated by way of a four-edged spool valve 10 which can be adjusted by means of an adjustment member 11.

In the illustrated embodiment, this adjustment member 11 is a linear drive which is actuated by a microprocessor 12 that precedes it. The actuation may here be effected as a function of momentarily measured values for speed, transmission ratio, number of revolutions of the drive, etc.

The pressure medium supplied by four-edged spool valve 10 to the cylinder-piston units 6 and 7 is furnished by a pump 13 which obtains it from a sump 14.

After passing through the control gap in four-edged spool valve 10, the pressure medium employed to set and maintain the transmission ratio flows through outlets 15 and 16 into discharge conduit 17, through which it is conducted by way of a pressurizing valve 18 and a torque sensor 19 back into sump 14. The pressure medium may here also be employed to lubricate and cool transfer means 5 and the pairs of cone discs 3 and 4.

By way of the throttling effect of pressurizing valve 18 and torque sensor 19, the basic pressure in discharge conduit 17 is determined, which produces an effect, on the one hand, on the contact pressers force of cylinder-piston units 6 and 7 and, on the other hand, on the pressure medium pressure to be furnished by pump 13.

Pressurizing valve 18 includes a stepped piston 20 which, on its smaller end face 21, is charged with the pressure of discharge conduit 17 and, on its larger, opposite end face 22, with a control pressure.

The region of the step of the control piston is pressure relieved by way of a conduit 23 and is therefore of no significance for the distribution of forces.

By means of its control edge 24, stepped piston 20 throttles the flow of pressure medium from discharge conduit 17 into a conduit 25 leading to torque sensor 19.

From this conduit 25, a conduit 26 branches off which conducts the pressure in conduit 25 to the larger end face 22 of stepped piston 20. During this action, however, the pressure is throttled by way of a control slide 27 which is displaced by way of a rod assembly 28 as a function of the transmission ratio in such a way that it throttles more intensively if the transmission ratio drops.

With slide 27 closed, the pressure at the larger end face 22 of stepped piston 20 drops completely in a conduit 29 that leads to sump 14 and is provided with a throttle 33. The pressure in discharge conduit 17 thus becomes equal to the pressure in the conduit 25 leading to the torque sensor.

However, in order for the pressure not to drop to below a desired minimum pressure if the load is very small, the stepped piston 20 is additionally charged by a spring 30.

If slide 27 is open, the pressure held by torque sensor 19 acts on the larger end face 22, and the pressure in discharge conduit 17 is increased relative to the sensor pressure in the ratio of the frontal end faces. The use of a spring 30 additionally increases the pressure in discharge conduit 17 by a constant value. It is of course also possible to configure the pressurizing valve without a spring 30.

The transition between the two mentioned positions of slide 27 can be made soft by sloping its control edge 31 so that a steady change in the augmentation factor between sensor pressure (conduit 25) and basic pressure (conduit 17) is possible as a function of the transmission ratio of the power train.

The pressure existing in conduit 25 downstream of pressurizing valve 18 is, as already mentioned, determined by the torque sensor 19 seated on drive shaft 1. This sensor throttles the pressure existing in conduit 25 as a function of the load acting on the transmission.

In the illustrated embodiment, the torque sensor is configured as a so-called torque pump which prevents the outflow of pressure medium from conduit 25 when there is a sudden surge in torque and pushes a predetermined pressure medium volume back into this conduit. This pressure medium volume travels through check valves 32 into pressure medium conduits 8 and 9 where it causes a sudden increase in pressure in cylinder-piston units 6 and 7. Due to the thus effected rapid rise in pressure, the contact pressure force of the pairs of cone discs against the transfer means is increased in the shortest time and prevents the transmission from slipping through due to the surge in torque.

In summary, the present invention constitutes a favorable possibility to provide pressure regulation according to requirements in a cone disc transmission of the above-mentioned type.

It will be understood that the above description of the present invention is susceptible to various modifications, changes and adaptations, and the same are intended to be comprehended within the meaning and range of equivalents of the appended claims.

What is claimed is:

1. An infinitely adjustable cone disc transmission including two pairs of cone discs that are disposed on the drive shaft and on the driven shaft as well as a transfer means rotating between them, wherein the cone discs are connected so as to rotate with the shaft supporting them, with one cone disc also being axially fixed on each shaft while the associated second cone disc is configured as an axially displaceable component of a cylinder-piston unit that is fixed to the shaft and receives pressure medium through an inlet from a four-edged spool valve so as to press on the transfer means and to adjust and maintain the transmission ratio, the spool valve being adjustable by means of an adjustment member and being provided with an outlet for the transported pressure medium; the outlet is connected to a discharge conduit which includes at least one torque sensor that is disposed on the drive shaft within the flow of moments at that location so as to influence the pressure medium pressure in the cylinder-piston units in dependence on the load, the torque sensor being hydraulically preceded by a pressurizing valve that is adjustable as a function of the transmission ratio and with which the pressure medium pressure can be additionally influenced, characterized in that the pressurizing valve is actuatable by a control pressure which, beginning with a pressure determined by the torque sensor as a function of the load is formed by a reduction as a function of the transmission ratio.

2. A transmission according to claim 1, characterized in that the pressurizing valve is a pressure ratio valve which includes a stepped piston whose one side is exposed to the pressure of the discharge conduit and whose other side to the control pressure.

3. A transmission according to claim 2, characterized in that, on the said other side, the stepped piston is charged with the constant force of a spring in addition to the control pressure.

4. A transmission according to claim 1, characterized in that the pressure determined by the torque sensor is throttled toward the control pressure by means of a throttling slide.

5. A transmission according to claim 2, characterized in that the throttling slide and the stepped piston are disposed in the same pressurizing valve.

6. A transmission according to claim 4, characterized in that the throttling slide and the stepped piston are disposed in the same pressurizing valve.

7. A transmission according to claim 4, characterized in that the throttling slide is actuatable by way of a sensor lever which is connected with one of the movable cone discs of the pairs of cone discs and senses the position of the gears.

8. A transmission according to claim 4, characterized in that the control edge of the throttling slide is sloped.

* * * * *